United States Patent [19]
Erickson et al.

[11] 3,847,626
[45] Nov. 12, 1974

[54] GLASS COMPOSITIONS, FIBERS AND METHODS OF MAKING SAME

[75] Inventors: Thomas D. Erickson, Newark; Warren W. Wolf, Reynoldsburg, both of Ohio

[73] Assignee: Owens-Corning Fiberglas Corporation, Toledo, Ohio

[22] Filed: Mar. 19, 1973

[21] Appl. No.: 340,985

Related U.S. Application Data

[63] Continuation-in-part of Ser. No. 298,702, Oct. 18, 1972.

[52] U.S. Cl. .................................. 106/50, 106/52
[51] Int. Cl. ............................................ C03c 13/00
[58] Field of Search ............ 106/50, 52; 65/12, 134

[56] References Cited
UNITED STATES PATENTS

| | | | |
|---|---|---|---|
| 3,736,162 | 5/1973 | Chvalovsky et al. | 65/3 |
| 3,783,092 | 1/1974 | Majumdar | 106/50 |
| 3,673,049 | 6/1972 | Giffen et al. | 106/52 X |
| 2,920,971 | 1/1960 | Stookey | 106/52 X |
| 3,540,893 | 11/1970 | Petticrew | 106/52 X |
| 2,908,036 | 10/1959 | Russell | 65/12 |
| 3,753,674 | 8/1973 | Ohlberg | 65/134 |

FOREIGN PATENTS OR APPLICATIONS

| | | | |
|---|---|---|---|
| 124,553 | 6/1947 | Australia | 106/50 |
| 217,609 | 7/1968 | U.S.S.R. | 106/50 |
| 141,273 | 1/1961 | U.S.S.R. | 106/50 |
| 259,337 | 4/1970 | U.S.S.R. | 106/50 |
| 1,160,535 | 8/1969 | Great Britain | 106/50 |
| 1,209,244 | 10/1970 | Great Britain | 106/50 |

*Primary Examiner*—Helen M. McCarthy
*Attorney, Agent, or Firm*—Carl G. Staelin; John W. Overman; Raymond E. Scott

[57] ABSTRACT

This disclosure relates to fiberizable glass compositions, fibers and the method of making textile glass fibers which are boron and fluorine free. Boron and fluorine have now been recognized as potential pollutants in the manufacture of fiberizable glasses and glass fibers and the following disclosure eliminates these pollutants by substituting $TiO_2$ and MgO in the basic three component glass composition of $SiO_2$, $Al_2O_3$ and CaO. The preferred glass composition consists essentially of, by weight, 54.5 to 60% $SiO_2$, 9 to 14.5% $Al_2O_3$, 17 to 24% CaO, 3 to 5% $TiO_2$ and 1.5 to 4.5% MgO.

6 Claims, No Drawings

3,847,626

GLASS COMPOSITIONS, FIBERS AND METHODS OF MAKING SAME

This application is a continuation-in-part of our copending application Ser. No. 298,702, filed Oct. 18, 1972. This application is also an improvement over our copending application for United States patent, Ser. No. 340,983.

BACKGROUND OF THE INVENTION

Fiberizable glass compositions presently include boron or fluorine containing compounds as fluxing agents which reduce the viscosity of the batch particularly during the early stages of melting. After recognition of boron and fluorine as potential pollutants, the problem has been to produce a glass composition (1) having the requisite physical properties for fiberization, (2) which is acceptable to the industry, and (3) which does not include fluorine and boron.

For example, E glass, which is the most common glass composition presently used for making textile fibers, has 9 to 11 percent by weight $B_2O_3$ and may contain fluorine as a fluxing agent. An important object of the present invention is to provide a substitute for E glass, while eliminating boron and fluorine. The specifications for E glass fibers also require that the percentage of alkali metal oxides, namely $Na_2O$, $K_2O$ and $Li_2O$, be less than one percent, by weight. Therefore, it is important to maintain the alkali metal oxide level of glass compositions at one percent, or less. This is particularly so when developing new glass compositions which may be used in place of E glass or others having one percent by weight or less of alkali metal oxides, calculated as $Na_2O$. The composition of E glass is disclosed in U.S. Pat. No. 2,334,961, assigned to the assignee of the instant application.

Boron is commonly supplied in the batch composition as colemanite, anhydrous boric acid or boric acid, while fluorine is added as $CaF_2$ or sodium silicofluoride ($Na_2SiF_6$). Melting of the glass batch raw materials in gas-fired furnaces, for example, to form molten glass from which fibers may be drawn and formed includes heating the batch and molten glass to temperatures in excess of 2,200°F. Commonly used textile fibers are melted in the range of 2,400° to 2,750°F. At these melting temperatures, $B_2O_3$ and $F_2$, or various compounds of boron and fluorine, tend to volatilize out of the molten glass and the gases can be drawn up the exhaust stacks and escape into the atmosphere surrounding the glass fiber forming area.

The resultant air and possible water pollution can be reduced or eliminated by a number of approaches. Water scrubbing or filtering of exhaust gases can often clean up exhaust air. Use of electric furnaces in place of gas-fired furnaces will virtually eliminate the losses of volatile fluxes (e.g., boron and fluorine) commonly associated with gas-fired furnaces at temperatures above 2,200°F. These clean-up approaches however are often costly and can be avoided if the source of the pollutants can be removed from the glass compositions. Complicating this solution, however, is the fact that removing boron and fluorine removes two commonly used fluxing ingredients in fiberizable, textile glass compositions. Maintaining acceptable melting rates, melting and operating temperatures, liquidus and viscosity in the absence of boron and fluorine has been found to be quite difficult.

An acceptable operating range in a commercial textile glass feeder or bushing is between 2,250° and 2,500°F. A glass composition that will operate smoothly in this environment preferably should have a liquidus temperature of approximately 2,200°F. or less and a viscosity of log 2.5 poises at 2,400°F., or less.

The fiber forming temperature is preferably about one hundred degrees Fahrenheit greater than the liquidus temperature to avoid devitrification (crystal growth) in the glass as the fibers are formed. Since devitrification causes irregularities or seeds in the glass, which hamper or may stop fiber production, the liquidus temperature of a commercial textile glass should preferably be less than about 2,200°F.

The viscosity of the glass is also a key to efficient and economical fiber forming. Glass viscosities of log 2.50 poises at 2,450°F, or more, require such high temperatures to melt the glass and make it flowable and formable into fibers that the metallic bushings or feeders may sag and become unusable or must be replaced or repaired more frequently than bushings contacting less viscous glasses.

In our above referenced copending application for United States patent, we have disclosed a four component glass composition and method, wherein 2 to 6 percent by weight $TiO_2$ is substituted for boron and fluorine as the fluxing agent. The composition of the four component glass consists of $SiO_2$, $Al_2O_3$, CaO and $TiO_2$. The addition of $TiO_2$ reduces the viscosity of the glass composition to within the fiberization range, however the liquidus temperature of this composition is still somewhat high for conventional fiberization equipment and techniques, although fibers can still be formed with this composition.

Another problem with the four component glass composition in certain applications is the yellow or brown color of the fibers formed from the glass composition. As described in this application, $Fe_2O_3$ is normally present in trace amounts up to one percent by weight from the raw materials, particularly sand. $Fe_2O_3$ in combination with $TiO_2$ will discolor the glass, which may be unacceptable in certain applications. The addition of MgO not only lowers the viscosity, but also permits the reduction of the concentration of $TiO_2$, which improves the color of the fibers formed from the glass composition.

With these problems in mind, the boron and fluorine free, fiberizable glass compositions and methods of this invention were developed.

SUMMARY OF THE INVENTION

The fiberizable glass composition of this invention is boron and fluorine free and consists essentially of, by weight, 54.5 to 60% $SiO_2$, 9 to 14.5% $Al_2O_3$, 17 to 24% CaO, 3 to 5% $TiO_2$ and 1.5 to 4% MgO. It will be understood that any glass composition will contain certain impurities which are added to the batch with the raw materials. For example, iron as $Fe_2O_3$ will be present in trace amounts up to one percent in the sand used as a raw material. The presence of $Fe_2O_3$ is important because it combines with $TiO_2$ to form a yellow or brown color in the resultant fiber, as described above, which may create a problem in certain applications. ZnO, $Na_2O$, $K_2O$ and $Li_2O$ would also normally be present or added in trace amounts, less than one percent, from the raw materials.

The addition of $TiO_2$, particularly as a substitute for $B_2O_3$ and $F_2$, to the basic three component glass composition lowers the viscosity of the glass to within the fiberization range, however the liquidus temperature still may be somewhat high for conventional commercial textile fiberization techniques. The addition of MgO lowers the liquidus temperature to within the fiberization range and makes the temperature of the molten batch less critical for conventional fiberization equipment. Further, the addition of MgO permits the utilization of lower concentrations of $TiO_2$, as will be seen from the examples below, reducing the discoloration of the glass fibers, which is important in many applications.

Titania ($TiO_2$) is marketed as a fine white powder, finding extensive use in paints to give opacity to enamels and the like. It is also used in glass decoration, however the use of $TiO_2$ as a substitute for $B_2O_3$ and $F_2$ to lower the viscosity of fiberizable glasses were quite unexpected. Magnesium oxide (MgO) is generally considered a comparatively inert constituent of glass compositions and may be added by the raw materials, such as lime and dolomitic lime. MgO has also been known to have an affect on the melting temperature of E glass, for example, and is added to E glass to control the devitrification of diopside ($CaOMgO2SiO_2$). It has now been discovered that 1.5 to 4.5 percent by weight of MgO reduces and controls the liquidus temperature within the fiberization range, as described above, and reduces the $TiO_2$ in the composition required to improve the color of the fibers. It will be noted from the Examples which follow that MgO is substituted primarily for CaO. In the preferred Examples given in our copending application disclosing a four oxide glass, the average CaO concentration in the four component glass is about 23.5 percent, by weight.

The addition of MgO and $TiO_2$ to the basic three component composition of $SiO_2$, $Al_2O_3$ and CaO reduces the viscosity and liquidus temperature of the glass to within the fiberization ranges and produces a glass composition suitable for fiberization with conventional equipment and techniques. This improvement was not expected from the teaching of the prior art and is considered an important step in the development of a boron and fluorine free fiberizable glass composition.

The preferred composition of the fiberizable glass composition of this invention also has less than one percent by weight of the alkali metal oxides, calculated as $Na_2O$. Further, the disclosed composition has a viscosity within the fiberization range of log 2.5 poises at 2,450 F. or less and a liquidus temperature of about 2,200°F., or less. Glass compositions falling within the above range can be drawn into fine, continuous fibers having a diameter of about $15 \times 10^{-5}$ to $55 \times 10^{-5}$ inches.

DESCRIPTION OF THE INVENTION

The glass composition and method of this invention substitutes $TiO_2$ and MgO for boron or fluorine to lower the viscosity of the molten glass to within the fiberization range. The preferred range of viscosity for the molten glass composition is log 2.5 poises at 2,500°F., or less and the glass composition preferably has a liquidus temperature of 2,200°F., or less.

The fiberizable, boron and fluorine glass composition of this invention consists essentially of, by weight, 54.5 to 60% $SiO_2$, 9 to 14.5% $Al_2O_3$, 17 to 24% CaO, 3 to 5% $TiO_2$ and 1.5 to 4% MgO. As described above, the preferred composition includes less than one percent, by weight, of the alkali metal oxides, specifically $Na_2O$, $K_2O$ and $Li_2O$, total, calculated as $Na_2O$. The method of making a boron and fluorine free textile fiber then includes adding to the basic three phase glass composition 3 to 5 percent by weight $TiO_2$ and 1.5 to 4.5% MgO, melting the batch to obtain a molten glass having a viscosity of log 2.5 poises at 2450°F., or less and a liquidus temperature of about 2,200°F. or less, and fiberizing the glass. The methods of fiberizing glass are described in the prior art patents, including U.S. Pat. No. 2,908,036, assigned to the assignee of the instant application.

The glass composition will also include certain additions, as described above, in trace amounts up to one percent by weight, including $Fe_2O_3$, $Na_2O$, $K_2O$, $Li_2O$ and ZnO. These additions or impurities are not considered to be part of the glass composition of this invention.

Specific compositions embodying the principals of this invention are described in the following Table 2, examples 1 to 17.

TABLE 1

| Ingredient | Example No. 1 (% by weight) | No. 2 | No. 3 | No. 4 | No. 5 | No. 6 | No. 7 | No. 8 | No. 9 | No. 10 |
|---|---|---|---|---|---|---|---|---|---|---|
| $SiO_2$ | 58.8 | 59 | 57.9 | 57.9 | 58.1 | 58.4 | 57.9 | 59.0 | 57.8 | 58.4 |
| $Al_2O_3$ | 10.9 | 11.9 | 9.9 | 12.1 | 12.1 | 12.1 | 12.1 | 12.1 | 12.1 | 13.3 |
| CaO | 21.5 | 20.8 | 22.6 | 21.4 | 22.1 | 21.4 | 21.6 | 21.1 | 21.3 | 20.7 |
| MgO | 3.2 | 3.3 | 3.3 | 3.2 | 3.2 | 3.2 | 3.2 | 3.2 | 3.2 | 3.2 |
| $Na_2O$ | 0.6 | 0.6 | 0.6 | 0.6 | 0.6 | 0.9 | 0.6 | 0.6 | 0.6 | 0.6 |
| $K_2O$ | — | — | — | — | 0.1 | 0.1 | 0.1 | — | 0.1 | — |
| $TiO_2$ | 4.9 | 4.4 | 4.3 | 4.7 | 3.7 | 3.7 | 4.3 | 3.7 | 4.8 | 3.7 |
| $Fe_2O_3$ | 0.2 | 0.1 | 0.1 | 0.2 | 0.2 | 0.2 | 0.2 | 0.2 | 0.2 | 0.2 |
| Liquidus: Temp, °F. | 2165 | 2145 | 2175 | 2150 | 2170 | 2155 | 2170 | 2160 | 2170 | 2160 |
| Viscosity: Temp, °F. at Log Poise | | | | | | | | | | |
| 2.0 | 2635 | 2615 | 2585 | 2600 | 2600 | — | — | 2600 | 2645 | 2600 |
| 2.5 | 2402 | 2425 | 2380 | 2400 | 2410 | 2405 | 2405 | 2430 | 2396 | 2445 |
| 2.75 | 2318 | 2345 | 2303 | 2320 | 2335 | 2327 | 2328 | 2339 | 2315 | 2365 |
| 3.0 | 2240 | 2275 | 2237 | 2250 | 2268 | 2265 | 2258 | 2262 | 2242 | 2291 |

TABLE 1 — Continued

| Ingredient | No. 11 | No. 12 | No. 13 | No. 14 | No. 15 | No. 16 | No. 17 |
|---|---|---|---|---|---|---|---|
| $SiO_2$ | 59.2 | 58.4 | 58.1 | 59.4 | 57.9 | 57.9 | 57.7 |
| $Al_2O_3$ | 12.9 | 13.7 | 10.6 | 10.5 | 12.1 | 12.1 | 13.9 |
| CaO | 22.6 | 20.7 | 23.6 | 22.3 | 22.4 | 22.9 | 21.1 |
| MgO | 3.3 | 3.3 | 3.2 | 3.3 | 2.2 | 1.7 | 3.2 |
| $Na_2O$ | 0.6 | 0.1 | 0.6 | 0.6 | 0.6 | 0.6 | 0.6 |
| $K_2O$ | — | 0.1 | 0.1 | — | 0.1 | 0.1 | — |
| $TiO_2$ | 4.3 | 3.7 | 3.7 | 3.7 | 4.7 | 4.7 | 3.4 |
| $Fe_2O_3$ | 0.1 | 0.2 | 0.1 | 0.2 | 0.2 | 0.2 | 0.2 |
| Liquidus: Temp: °F. | 2175 | 2190 | 2210 | 2215 | 2200 | 2200 | 2205 |
| Viscosity: Temp: °F. at Log Poise | | | | | | | |
| 2.0 | 2675 | 2672 | 2611 | 2630 | 2580 | 2731 | 2615 |
| 2.5 | 2465 | 2470 | 2380 | 2415 | 2405 | 2405 | 2437 |
| 2.75 | 2385 | 2390 | 2285 | 2325 | 2330 | 2330 | 2358 |
| 3.0 | 2311 | 2318 | 2202 | 2250 | 2265 | 2255 | 2279 |

The viscosity determinations in Examples 1 through 17 were obtained using the apparatus and procedure described in U.S. Pat. No. 3,056,283 and in the article in *The Journal of the American Ceramic Society*, Vol 42, No. 11, Nov., 1959, pages 537–541. The article is entitled "Improved Apparatus for Rapid Measurement of Viscosity of Glass at High Temperatures" by Ralph L. Tiede. Other specific viscosity determinations referred to herein also would be measured by the apparatus and procedures in the Tiede article.

The glass compositions of this invention, some of which are described in Table 1, Examples 1 through 17, have a liquidus temperature of 2,200°F. or less except for Examples 13, 14 and 17. having a maximum of 2,215°F. These glasses are therefore suitable for fiber forming and direct replacement of E glass and similar textile glass fiber forming glasses containing boron and fluorine with boron and fluorine free glasses is therefore possible.

All of the glass compositions in Table 1 contain one percent by weight or less of the alkali metal oxides, as described above and thus these glasses in fiber form will be acceptable to consumers requiring low levels of the alkali metal oxides. The primary glass forming ingredients in the glass compositions of this invention are $SiO_2$ and $Al_2O_3$. The basic three oxide glass composition includes $SiO_2$, $Al_2O_3$ and CaO.

$TiO_2$ (titania) is used in the glass composition of this invention as a flux in place of boron and fluorine. The titania, as described above, reduces the viscosity in these compositions without adversely affecting the liquidus temperature. $TiO_2$ should be used in these compositions in amounts of 6 percent, by weight, or less. Concentrations of titania above the 6 percent causes the liquidus temperature to reach undesirable levels. Further, concentrations of $TiO_2$ above 6 percent also causes a distinct brownish tint or coloration to the glass fibers. This can be a problem where the fibers are combined with a clear matrix material and are visible in the final product. Clear plastic panels or clear plastic fishing rods are examples of products that might be less desirable if tinted fibers are utilized. The concentration of MgO in the glass composition of this invention is between 1.5 and 4 percent, by weight. Concentrations of MgO above this range increases the liquidus temperature beyond the acceptable limit for fiberization.

The alkali metal oxides ($Li_2O$, $Na_2O$ and $K_2O$) are used in some compositions to control the viscosity. $K_2O$ can be utilized by itself in amounts up to one percent by weight. $Na_2O$ can be utilized in combination with $Li_2O$ or $K_2O$. When $Na_2O$ and $K_2O$ are combined, they should be used in amounts that, when calculated as equivalent molecular weight percent of $Na_2O$, will total less than one percent, by weight. When $Na_2O$ is used with the maximum of 0.3 percent by weight $Li_2O$, the $Na_2O$ should be used in amounts of 0.2 percent, or less, in order to keep the total alkali metal oxide (calculated as $Na_2O$) level at or below one percent by weight.

As described above, $Fe_2O_3$ may be included within the disclosed glass composition as an impurity of the batch raw materials or it may be added intentionally in amounts up to one percent by weight. $Fe_2O_3$ can, however, discolor the glass and fibers drawn from the glass, particularly in combination with $TiO_2$ and the concentration of $Fe_2O_3$ should therefore be kept as low as possible when clear glass fibers are required for the end use. In product applications where clear glass fibers are required, the concentration of $Fe_2O_3$ should be maintained at 0.5 percent by weight, or less, and preferably below 0.2 percent, by weight.

Various other impurities or tramp materials may be present in the glass compositions in amounts of about 0.3 percent or less by weight, without adversely affecting the glasses or fibers. These impurities will include chromic oxide ($Cr_2O_3$), oxides of vanadium, sulfates and phosphates. These impurities can enter the glass as raw material impurities or can be products formed by the chemical reaction of the molten glass with the furnace components.

Modifications and variations within the scope of the appended claims are intended to be included.

We claim:

1. A boron and fluorine free fiberizable glass, consisting essentially of, by weight, 54.5 to 60 percent $SiO_2$, 9 to 14.5 percent $Al_2O_3$, 17 to 24 percent CaO, 3 to 5 percent $TiO_2$ and 1.5 to 4.5 percent MgO and having a liquidus temperature of about 2,200°F. or less and having a viscosity of log 2.5 poises at 2,450°F. or less.

2. The glass composition defined in claim 1, characterized in that said glass composition includes less than one percent, by weight, of $Na_2O$, $K_2O$ and $Li_2O$, total, calculated as $Na_2O$ in equivalent molecular weight percent.

3. The method of making a fiberizable glass composition having a liquidus temperature of 2,200°F. or less and a viscosity of log 2.5 poises at 2,450°F. or less from a glass batch consisting essentially of $SiO_2$, $Al_2O_3$ and CaO, by adding to the batch 3 to 5 percent by weight $TiO_2$ and 1.5 to 4.5 percent by weight MgO, melting the glass composition and reducing the temperature of the molten glass to within the fiberization temperature range.

4. The method of making a fiberizable glass composition defined in claim 4, wherein the three component composition consists essentially of from 54.5 to 60 percent $SiO_2$, 9 to 14.5 percent $Al_2O_3$, 17 to 24 percent CaO, 3 to 5 percent $TiO_2$, 1.5 to 4.5 percent MgO and less than 1 percent, total, $Na_2O$, $K_2O$ and $Li_2O$, calculated as $Na_2O$ in equivalent molecular weight percent.

5. A boron and fluorine free textile glass fiber, consisting essentially by weight of 54.5 to 60 percent $SiO_2$, 9 to 14.5 percent $Al_2O_3$, 17 to 24 percent CaO, 3 to 5 percent $TiO_2$, 1.5 to 4.5 percent MgO and less than 1 percent, total, $Na_2O$, $K_2O$ and $Li_2O$, calculated as $Na_2O$ in equivalent molecular weight percent.

6. A boron and fluorine free textile glass fiber having less than 1 percent by weight, total, alkali metal oxides, calculated as $Na_2O$, consisting essentially of:

| Component | Percent By Weight |
|---|---|
| $SiO_2$ | 54.5 to 60 |
| $Al_2O_3$ | 9 to 14.5 |
| CaO | 17 to 24 |
| $TiO_2$ | 3 to 5 |
| MgO | 1.5 to 4.5 |
| $Na_2O$ | 0 to 1 |
| $K_2O$ | 0 to 1 |
| $Li_2O$ | 0 to 0.3 |
| $Fe_2O_3$ | 0 to 1 | wherein the glass composition has a liquidus temperature of about 2,200°F. or less and a viscosity of log 2.5 poises at 2,450°F. or less.

* * * * *